(12) United States Patent
Robinson et al.

(10) Patent No.: US 6,334,081 B1
(45) Date of Patent: Dec. 25, 2001

(54) VEHICLE COMMUNICATION LINK AUTO DETECTION

(75) Inventors: Timothy Alan Robinson, Avon, IN (US); James H. Stewart, Gulfport, MS (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/578,025

(22) Filed: May 24, 2000

(51) Int. Cl.[7] .................................................. G06F 17/00
(52) U.S. Cl. .................................. 701/48; 701/32; 701/36
(58) Field of Search .................................. 701/48, 36, 55, 701/29, 32, 33, 35

(56) References Cited

U.S. PATENT DOCUMENTS

| | | | |
|---|---|---|---|
| 5,343,472 | * | 8/1994 | Michihira et al. ................ 370/85.6 |
| 5,369,584 | * | 11/1994 | Kajiwara ............................. 701/36 |
| 5,444,626 | * | 8/1995 | Schenk ................................ 701/102 |
| 5,832,397 | * | 11/1998 | Yoshida et al. ........................ 701/29 |
| 5,848,365 | * | 12/1998 | Coverdill ............................... 701/35 |
| 5,856,976 | * | 1/1999 | Hirano ................................ 370/401 |
| 6,009,370 | * | 12/1999 | Minowa et al. ..................... 701/102 |

* cited by examiner

Primary Examiner—Tan Nguyen
(74) Attorney, Agent, or Firm—Christopher DeVries

(57) ABSTRACT

A vehicle controller including communication hardware for receiving data transmissions from an automotive communication network, control software to control an automotive system, the control software requiring process data from at least one of a plurality of controllers linked to the automotive communication network to control the automotive system, the plurality of controllers broadcasting the process data over the automotive communication network, calibration software containing constants for the operation of the control software, communication software used in conjunction with the communication hardware for polling the automotive communication network for the required process data and identifying a source controller of the required process data, and memory in the vehicle controller for storing the source ID of the source controller, wherein upon identification of the source controller of the required process data, the communication software will read the required process data from the source controller.

19 Claims, 4 Drawing Sheets

VEHICLE COMMUNICATION LINK AUTO DETECTION

TECHNICAL FIELD

The present invention relates to on-board vehicle controllers. More specifically, the present invention relates to a method and apparatus for on-board vehicle controllers to communicate and transfer data.

BACKGROUND OF THE INVENTION

An area in the auto industry seeing tremendous change from past practices is the area of control and communication in automotive vehicles. The creation of relatively inexpensive microprocessors and the digital. revolution have put the power of advanced electronics and communication into the hands of automotive engineers. Controllers, microprocessors, and other electronic devices control and monitor various systems in a vehicle such as the transmission, the internal combustion engine, braking systems, and other related systems. The information stored on the controllers in the vehicle during some vehicle functions must be communicated between the controllers for operation of the vehicle systems. For example, the transmission controller may need engine speed information from the engine controller or braking information from the brake controller to properly shift a transmission apparatus.

Vehicle controllers typically include software separated into a logic section and a calibration section. The logic section includes the executable control methods of operation, and the calibration section generally includes constants and other variables used in the operation of the logic section, such as a table of shift schedules for a transmission. The calibration section may be modified to operate with different vehicles having different engine types and diverse performance and physical characteristics.

Traditional vehicle controllers are rigidly calibrated or pre-programmed for the types and amount of data that may be transferred for a particular vehicle platform. It would be advantageous to use a single calibration, for a vehicle controller controlling a specific automotive system such as a transmission controller, with multiple vehicle platforms.

SUMMARY OF THE INVENTION

In accordance with the present invention, an on-board vehicle controller includes a method and apparatus to automatically detect a source controller or source device of data, required for the operation of a vehicle control system(s), via an automotive communication network linking a plurality of vehicle controllers. The control systems may include a vehicle engine, a braking system or a transmission system, but is not limited to such. Information is transmitted between the controllers in a vehicle, via an automotive communication network, such as IES-CAN, GMLAN, J1850, and J1939, but is not limited to such. The vehicle controller of the present invention will monitor the network for vehicle data required to operate the control system and identify the source controller of the required vehicle data. For example, J1939 uses a communication protocol which permits any device on the network to transmit a message when the network is idle. A large portion of the messages transmitted under the J1939 protocol are intended to be broadcast, i.e., the data is transmitted on the network without directing the message to a specific destination. Any device on the network, including the vehicle controller of the present invention, may access the data on the message without requiring a request. Every message includes an identifier which defines the message priority, the device ID or address of the vehicle controller that sent the message, and what data is contained within the message. The vehicle controller will monitor the device IDs or addresses of specific controllers transmitting messages over the automotive communication network and compare those device IDs to a list of device IDs in the vehicle controller calibration.

The vehicle controller of the present invention through polling of the automotive communication network and the identification of device IDs on the network will be able to assess the control system make-up of the vehicle, i.e., what vehicle controllers and control systems are in the vehicle and communicating over the network. Accordingly, the vehicle controller of the present invention will be able to determine the data it will need from the vehicle controllers of the control systems of the vehicle by referencing its calibration and the device IDs found on the network. For example, if the vehicle contains an engine compression brake, the engine controller will broadcast messages over the network containing compression brake data that may be identified by vehicle controller of the present invention. By identifying the types and sources of data in the vehicle, the vehicle controller of the present invention is capable of determining what tables and constants it should use in the calibration data stored in its memory. In this manner, a single calibration may be stored in a vehicle controller for use with a plurality of vehicle platforms.

As discussed previously, the vehicle controller identifies the vehicle and its control systems and then determines the data it will need from each system by using its stored calibration data. The vehicle controller then identifies the source controller of required operation data and stores the device ID code in RAM or nonvolatile memory, depending whether the device ID of the source controller is learned only once or repeatedly. The vehicle controller will then continuously receive the required data from the source controller for operation.

The vehicle controller of the present invention has many potential advantages over present vehicle controllers, including reduced calibration proliferation. One calibration may be used for several different vehicle platforms that communicate a particular piece of information via a communication link, but from different source controllers. Without this invention, different calibrations would have to be used for each vehicle platform.

BRIEF DESCRIPTION OF THE DRAWINGS

The various advantages of the present invention will become apparent to one skilled in the art upon reading the following specification and by reference to the drawings in which.

DESCRIPTION OF THE PREFERRED EMBODIMENT

Figure 1:
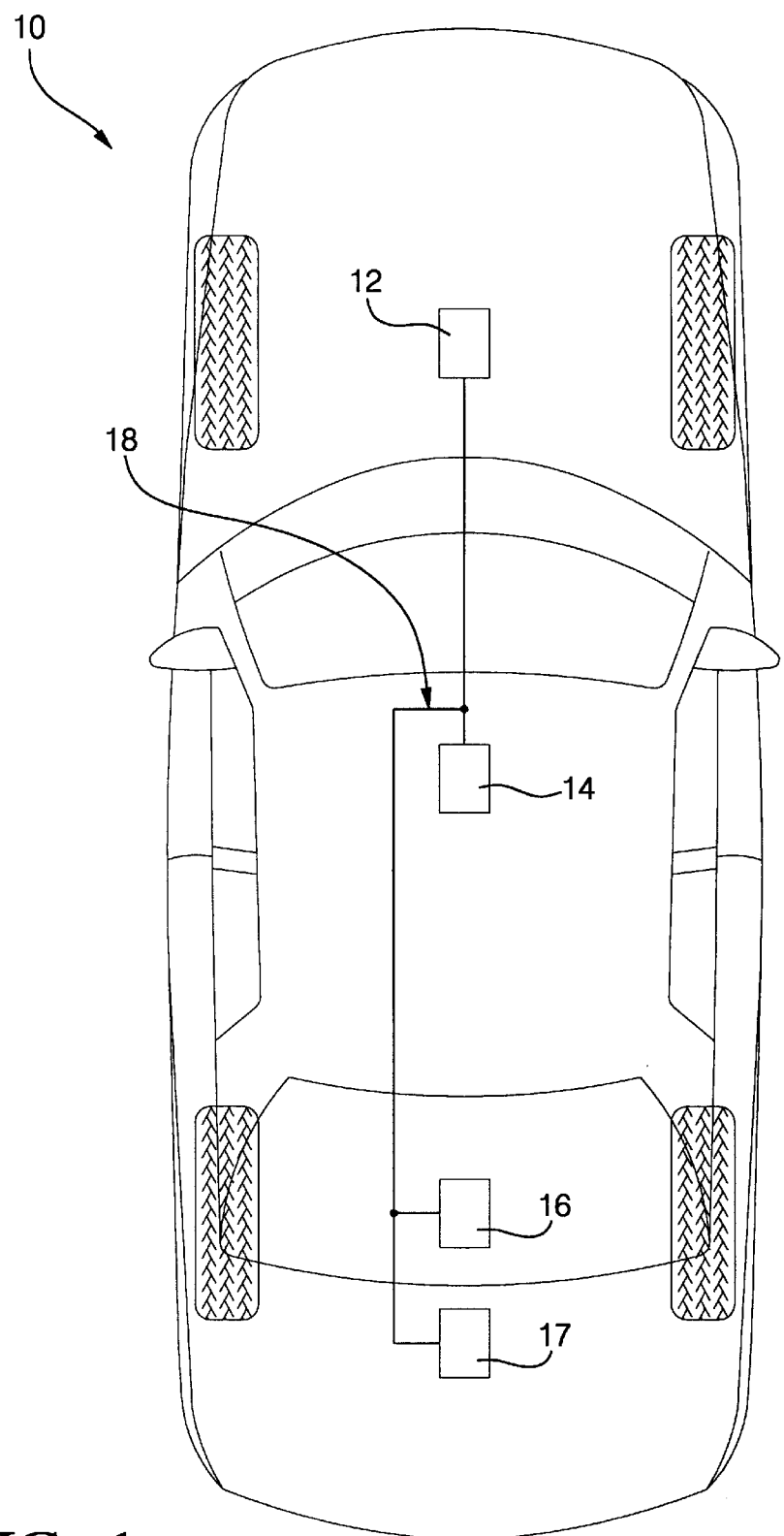
FIG. 1 is a diagrammatic drawing of a vehicle incorporating the vehicle controller of the present invention.

Referring to FIG. 1, a vehicle 10 is shown including a plurality of on-board vehicle controllers 12, 14, 16, and 17.

The term "on-board" is defined as being located in a substantially permanent manner on or within the vehicle 10. Vehicle controller 12 is preferably an engine controller, vehicle controller 14 is preferably a transmission control module, vehicle controller 16 is preferably a brake control module, and vehicle controller 17 is preferably an exhaust/emission controller, but any type of vehicle controller or control module is considered within the scope of this invention. The vehicle controllers 12, 14, 16, and 17 communicate via an automotive communication network 18. The communication network 18 preferably operates under the J1939 protocol but may comprise any known vehicle communication system such as IES-CAN, GMLAN, J1850, or CCD, but is not limited to such. The vehicle controllers 12, 14, 16, and 17 communicate over the communication network 18 to access and exchange vehicle process variables and data necessary for the operation of various vehicle systems. In a first example, the transmission controller 14 receives engine retarder brake torque, generated by an engine compression brake, from the engine controller 12 needed to calculate a transmission shift. In a second example, the engine does not include a compression brake, and the transmission controller receives engine retarder torque generated by an exhaust brake from the exhaust/emission controller 17. As seen from the two examples, a single process variable such as engine retarder torque may be generated by different controllers/control systems in a vehicle, depending on the make-up of a vehicle platform.

The transmission controller 14 must determine what types of controllers/control systems are on the vehicle to determine what type of data is needed and the source controller of the data. Referring to the previous example, if the engine retarder torque is generated by a compression brake, then the transmission controller 14 must store this information and designate the engine controller 12 as the source ID for that particular piece of data. If the engine retarder torque is generated by an exhaust brake, then the transmission controller must designate the exhaust/emission controller 17 as the source ID for the information. While engine retarder torque has been used as an example, the vehicle controller of the present invention will be able to determine the presence and source of any type of vehicle data broadcast over the automotive communication network 18.

Figure 2:
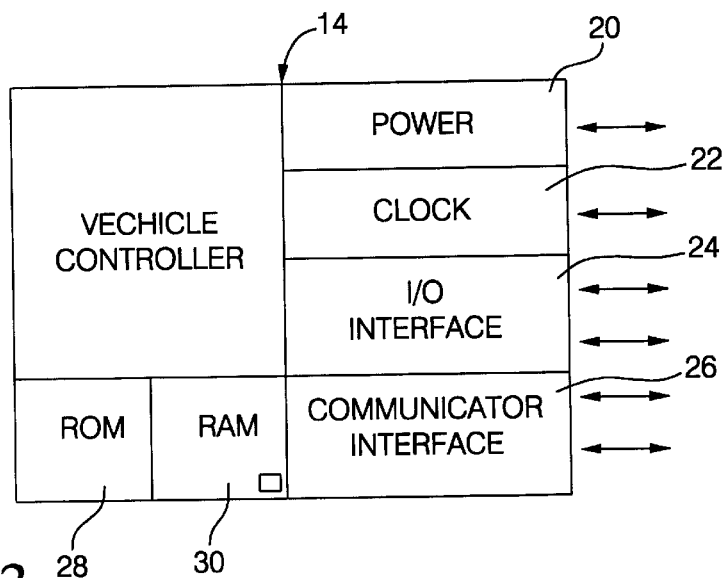
FIG. 2 is a block diagram of the vehicle controller of the present invention.

FIG. 2 is a block diagram generic to all of the vehicle controllers 12, 14, 16, and 17 used in the present invention, but for simplicity only the vehicle controller 14 will be described. The vehicle controller 14 includes a power interface 20, clock input 22, an input/output interface 24 having analog and digital capabilities, and a communication interface 26 to transfer data over the automotive communication protocols/networks previously described in the specification. The vehicle controller 14 in the preferred embodiment may communicate, via communication interface 26, over multiple communication networks simultaneously to receive and transfer data from multiple vehicle controllers.

The vehicle controller 14 further includes ROM 28 and RAM 30. The ROM 28 includes the basic operating system, the calibration of the vehicle controller 14, IDs for source controllers containing required data for the operation of the vehicle controller 14, and any other data or parameters which generally require permanent storage in the vehicle controller 14. The function of the RAM 30 includes the manipulation and storage of vehicle process variables.

Figure 3:
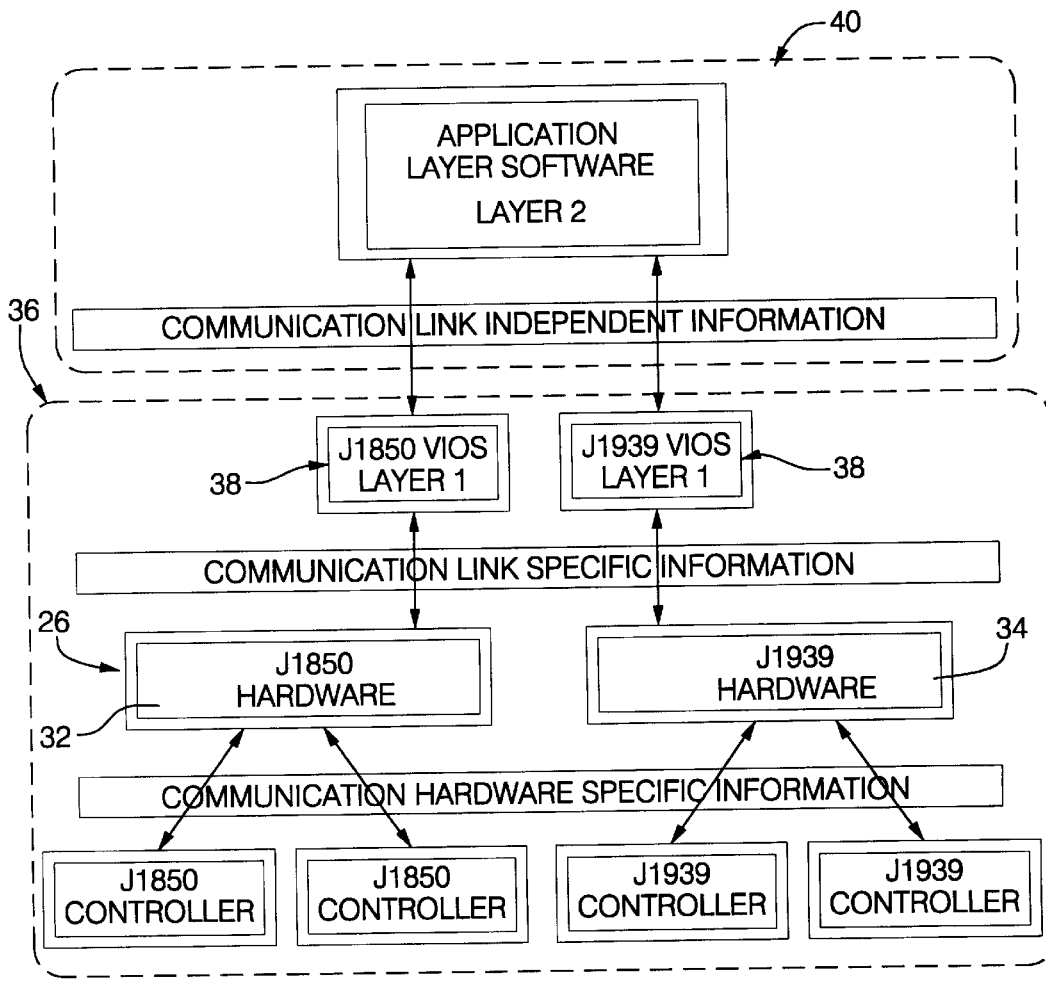
FIG. 3 is a diagrammatic drawing of the communication architecture of the vehicle controller of the present invention.

FIG. 3 is a diagrammatic drawing of the preferred embodiment of the vehicle controller 14 communication architecture of the present invention. The communication interface 26 of the vehicle controller 14 of the present invention includes specific communication hardware such as a J1850 communication interface 32 and a J1939 communication interface 34 shown in FIG. 3, but is not limited to such. In the communication architecture of the vehicle controller 14, communication specific hardware and software is included in a first datalink/network layer 36. The first layer 36 handles all of the communication link specific message processing for the previously mentioned vehicle networks, including interfacing with the hardware and receiving, transmitting, filtering, and buffering of all messages between the vehicle controllers 12, 14, 16 and 17. Incoming requests from a controller to the vehicle controller 14 are reformatted into generic form by a virtual input system (VIOS) 38 and made available to a second communication layer 40 for processing. The VIOS 38 enables the second communication layer 40 to be communication protocol non-specific. The second layer 40 data is generic and may be used with multiple communication protocols and their associated hardware and software. The first layer 36 formats each response to a communication link in use and handles the transmit process via the communication hardware.

Figure 4:
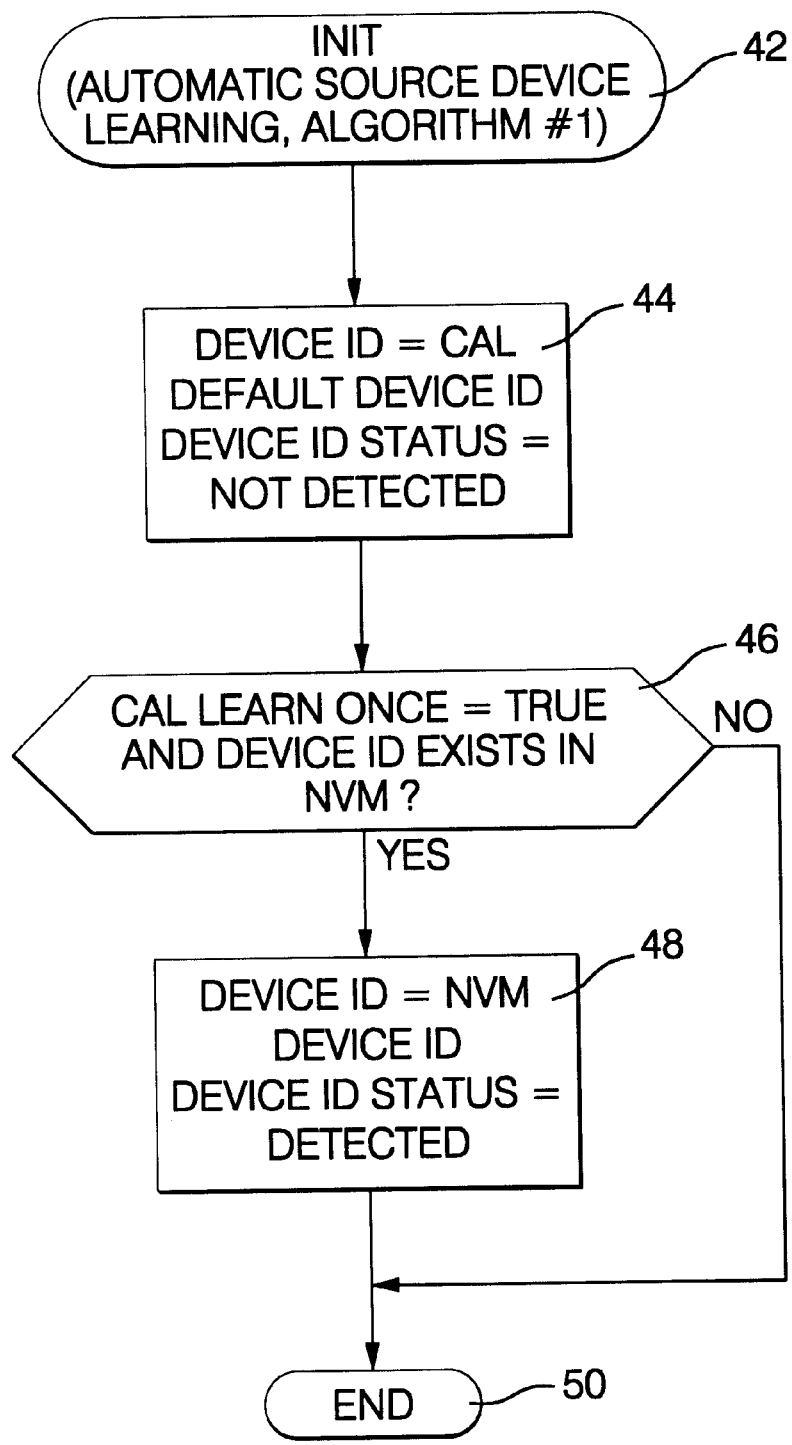
FIGS. 4 and 5 are flowcharts of the methods/routines used by the vehicle controller of the present invention to transfer data between vehicle controllers.
Figure 5:
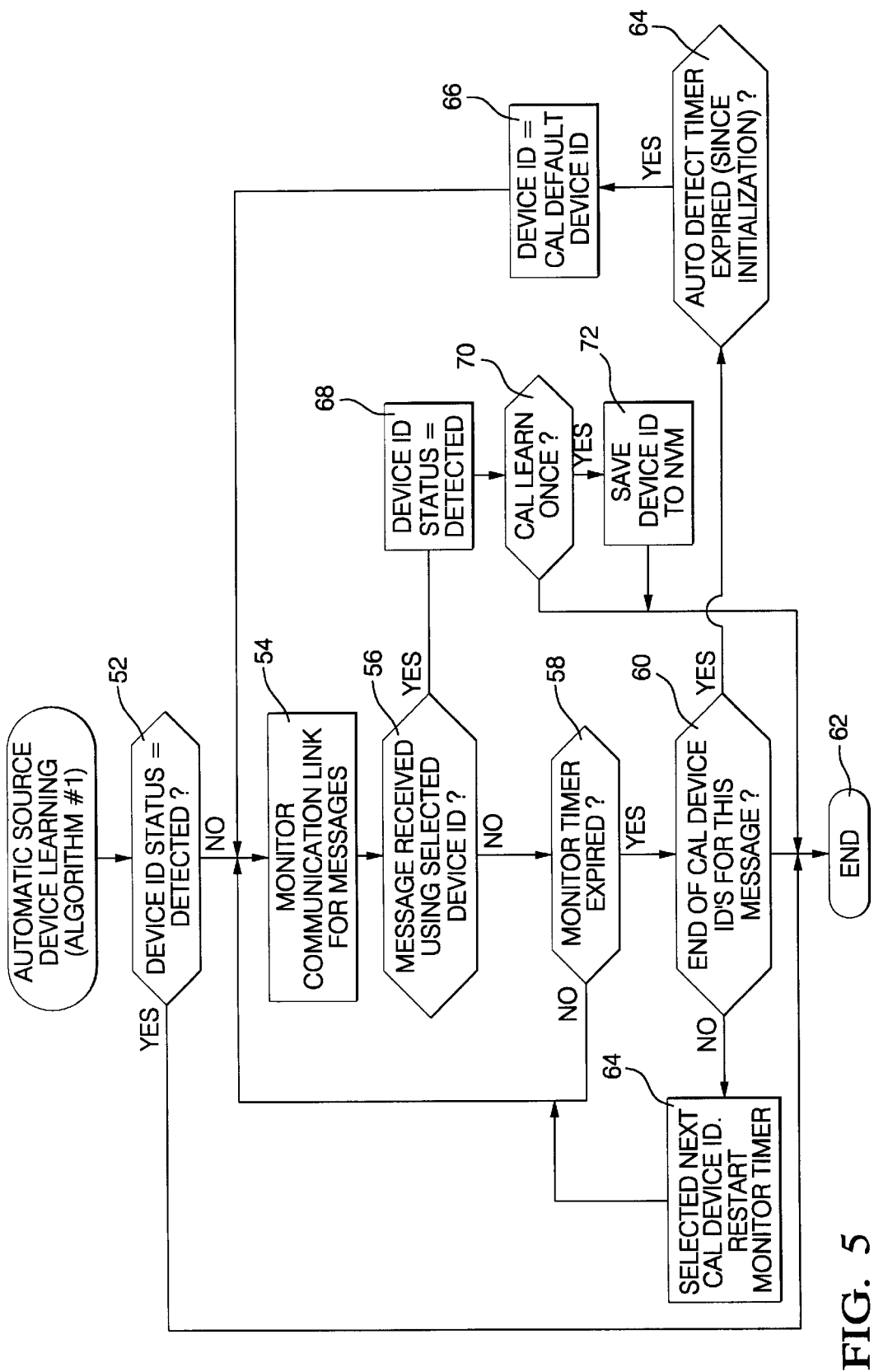

FIGS. 4 and 5 are flowcharts of the methods and routines used by the vehicle controller 14 of the present invention to find a source controller for data required in the operation of the vehicle controller 14. Referring to FIG. 4, at block 42 an automatic source device learning method/routine is started. Continuing to block 44, the device ID for a source controller having required vehicle data is set to a calibration default device ID (until the correct device ID for a source device is learned). A flag for device ID status is also set to indicate that the device ID of the source device is not detected. At block 46 the routine references a preset calibration value to determine if the device ID of a source controller is to be learned only once after the vehicle is built and if the device ID exists in nonvolatile memory. If yes, then at block 48 the device ID stored in NVM is used to identify the source controller and a device ID status flag is set to detected or true. If no, the routine ends at block 50.

FIG. 5 is a flowchart that details how controller 14 polls the automotive communication network 18 for required vehicle data and source controller device IDs. At block 52 the routine checks if the device ID status flag is set to indicate that a particular device ID has been detected. If yes, then the device ID has been detected and the routine of FIG. 5 does not need to be run, as the device ID is known. If the device ID status flag is not set, then the routine continues to block 54 where the automotive communication network 18 is monitored by the vehicle controller 14 for broadcast messages from any controllers on the communication network 18. At block 56 the routine determines if a message has been received using a selected device ID. The selected device ID is one of the IDs selected from a calibration list of IDs that the routine of the present invention searches for on the communication network 18. If a message has not been received using a selected device ID, the routine continues to block 58 to determine if a monitor timer has expired. If no, the routine returns to block 54. If yes, the routine continues to block 60 to determine if it is the end of a list of calibration device IDs for a particular message. A calibration list of device IDs to search, for each received message, is preprogrammed into ROM for the vehicle controller 14. The routine only looks for messages from devices or controllers on the communication network 18 that match one of the device IDs in the pre-defined list for a particular message. For example, referring to the previous examples, engine retarder torque may come from the engine controller 12 or the exhaust/emission controller 17 both having their device IDs in the calibration list. If all of the device IDs in the calibration list have been searched for on the network for a particular message, then the routine ends at block 62 with no source controller device ID detected. If it is not the end of the list for calibration device IDs for the message, the routine continues to block 64 where it is determined if the autodetect timer has expired (since initialization). The device ID is then set to the calibration default device ID at block 66 with the routine continuing to block 54.

Returning to block 56, if the message received is using a selected device ID, then the routine continues to block 68 where the device ID status flag is set as detected or true. Continuing to block 70, the routine determines if the calibration indicates if the device ID should be learned. If no, the routine ends at block 62. If yes, the device ID is saved to ROM 28 or nonvolatile memory at block 72.

While this invention has been described in terms of some specific embodiments, it will be appreciated that other forms can readily be adapted by one skilled in the art. Accordingly, the scope of this invention is to be considered limited only by the following claims.

What is claimed is:

1. A method of establishing communication and transferring data between a plurality of controllers in a vehicle, the method comprising the steps of:

a first controller polling an automotive communication network linking the first controller to the remaining plurality of controllers for messages broadcast by the remaining plurality of controllers over the automotive communication network;

determining which of the remaining plurality of controllers contains required data as a source controller by the first controller;

learning a device ID of the source controller; and the first controller communicating with the source controller to access the required data.

2. The method of claim 1 further comprising the step of providing the calibration software for the vehicle controller.

3. The method of claim 2 further comprising the steps of providing the calibration software with data for a plurality of vehicle platforms.

4. The method of claim 1 further comprising the step of controlling an automotive transmission with the first controller.

5. The method of claim 4 further comprising the step of shifting the automotive transmission in response to data received from at least one of the remaining plurality of controllers.

6. The method of claim 1 further comprising the step of identifying at least one control system of the vehicle controlled by at least one of the remaining plurality of controllers.

7. The method of claim 6 wherein the step of identifying at least one control system of the vehicle comprises analyzing the messages broadcast on the automotive communication network for control system identifying data.

8. A vehicle controller comprising:

communication hardware for receiving data transmissions from an automotive communication network;

control software to control an automotive system, the control software requiring process data from at least one of a plurality of controllers linked to the automotive communication network to control the automotive system, the plurality of controllers broadcasting the process data over the automotive communication network;

calibration software containing constants for the operation of the control software;

communication software used in conjunction with the communication hardware for polling the automotive communication network for the required process data and identifying a source controller of the required process data; and memory in the vehicle controller for storing the device ID of the source controller, wherein upon identification of the source controller of the required process data, the communication software will read the required process data from the source controller.

9. The vehicle controller of claim 8, wherein the calibration software is capable of being used with multiple vehicle platforms.

10. The vehicle controller of claim 8 wherein the automotive network is operated under the J1939 protocol.

11. The vehicle controller of claim 8 wherein the vehicle controller is an automotive transmission controller.

12. The vehicle controller of claim 8 wherein the plurality of vehicle controllers include an engine controller and a brake controller.

13. The vehicle controller of claim 8 wherein the process data includes engine retarder brake torque data.

14. The vehicle controller of claim 8 wherein the vehicle controller identifies specific vehicle control system and associated vehicle controllers by monitoring the automotive communication network.

15. An automotive communication network comprising:

a plurality of communicating vehicle controllers, at least one of the vehicle controller being an automotive transmission controller;

control software in the transmission controller to control an automotive transmission, the control software requiring process data from at least one of the plurality of controllers;

calibration software in the transmission controller containing constants for the operation of the control software;

communication software used in the transmission controller for polling the plurality of communicating vehicle controllers for the required process data and identifying a device ID for a source controller of the required process data; and memory in the vehicle controller for storing the device ID of the source controller, wherein upon identification of the source controller of the required process data, the transmission controller will read the required process data from the source controller.

16. The automotive communication network of claim 15, wherein the calibration software is capable of being used with multiple vehicle platforms.

17. The automotive communication network of claim 15, wherein the automotive network is operated under the J1939 protocol.

18. The automotive communication network of claim 15 further comprising a virtual input system.

19. The automotive communication network of claim 18 further comprising a communication layer communicating with said virtual input system, wherein communicated data is generic and may be used by a plurality of communication protocols.

* * * * *